G. W. Rodeboy,
Circular Saw Mill.
Nº 17,518. Patented June 9, 1857.
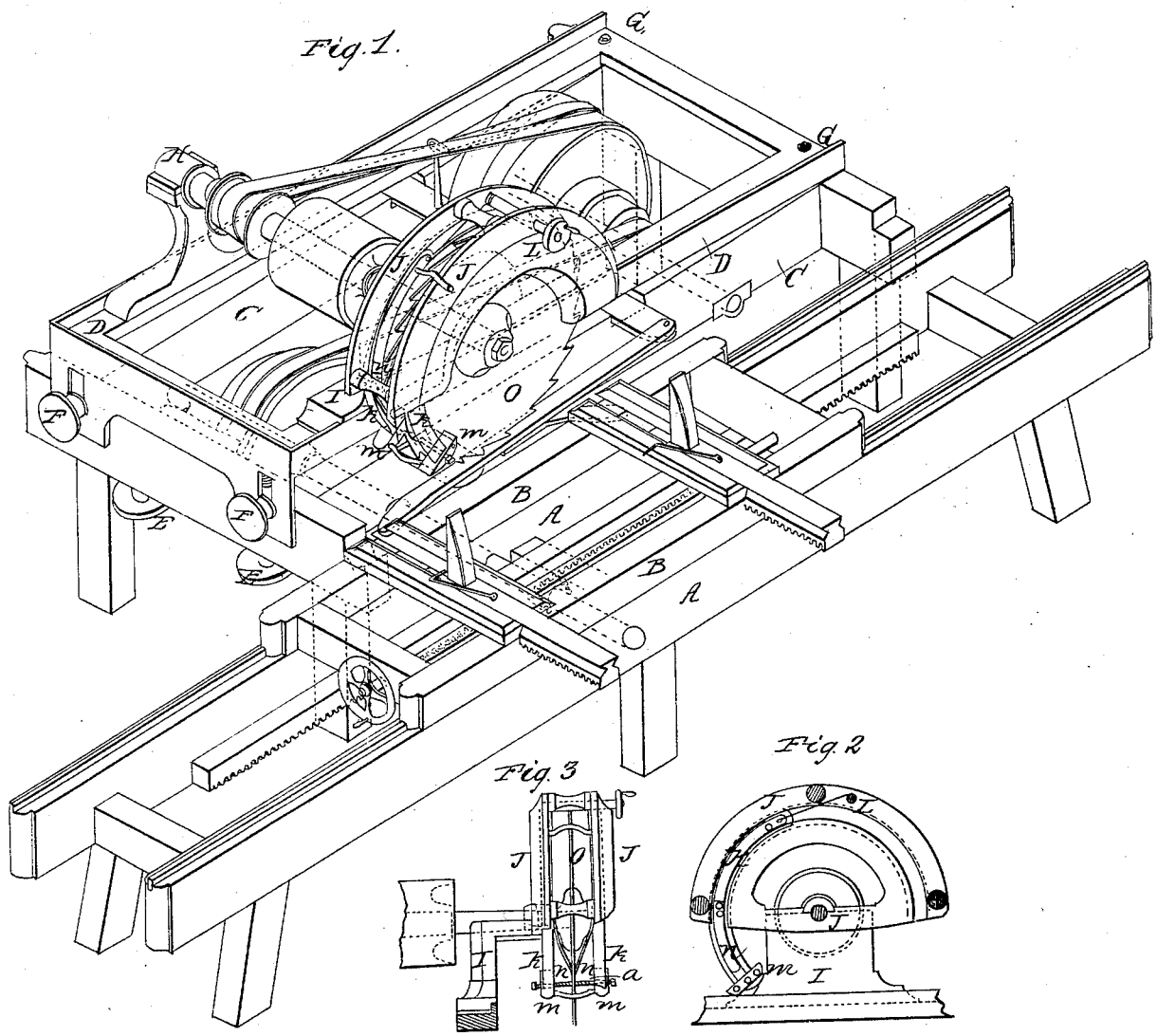

UNITED STATES PATENT OFFICE.

GEO. W. RODEBOY, OF MILWAUKEE, WISCONSIN.

SHIELD AND GUIDE FOR CIRCULAR SAWS.

Specification of Letters Patent No. 17,518, dated June 9, 1857.

*To all whom it may concern:*

Be it known that I, GEORGE W. RODEBOY, of the city and county of Milwaukee, in the State of Wisconsin, have invented certain new and useful improvements in the construction of a machine for sawing boards, plank, and other descriptions of lumber from the log, as well as resawing lumber for manufacturing purposes, of which the following is a full, clear, and exact description, reference being had to the annexed drawings of the same, making a part of this specification, in which—

Figure 1, is an isometrical view of the main parts of the whole machine as they appear in operation. Fig. 2, a detached representation of the metallic stationary shield covering the upper half of the circular saw plate, together with the rising and falling circular muley head. Fig. 3, is a detached end view of the same.

The chief defects in mills hitherto employed in sawing lumber from the log by means of circular saws have been found upon experiment to be. First, great and continued danger to the operator, on account of there being no shield or protection over the saw plate while in motion or process of cutting, as well as the liability of the saw to break and fly in pieces to the destruction of life and property. Second, the necessity of using saw plates so thick as to occasion a prodigal waste of material in cutting its way through the log or dividing the lumber, thereby greatly increasing the friction, and necessarily causing a greater expenditure of power in running the mill. Third, the saw is only guided in most of the present machines after it has made its cut through the log, owing to the guide being below the point where the teeth of the saw cut, and in those wherein it is guided before the cut, or above the point where the teeth of saw cut, as in machines where the saw is hung over the log, there is necessarily a large portion of the depth of the saw taken up by the guides and consequently the saw is prevented from cutting a full depth from the collar to the end of the teeth. And besides this if the saw when elevated is required to cut its whole depth it is not guided at all in the old way, and therefore the idea of using the saw above the cut or log has heretofore been viewed as impracticable.

These several dangers, defects and difficulties are overcome, and all the essential requisites of a practical and economical machine for sawing every description of lumber by means of circular saws acquired, by the improvements introduced in my machine, which consist, first, in suspending over the upper half of a saw, which is arranged to hang over the log to be sawed, a stationary metallic shield in such a manner as to absolutely prevent the operator from coming in contact with the saw no matter how deep may be its cut and furnishing at the same time, a complete safeguard against destruction to life or property in case the saw in its rapid revolutions should part or fly in pieces, a thing of frequent occurrence.

Second, it consists in the peculiar manner of arranging the circular muley head on the stationary elevated shield, whereby the guides are capable of being adjusted to any position desired, and are always made to guide the saw at the point of cutting without in the least taking up any portion of the cutting depth of the saw, and whereby the saw is guided with such exactness as to prevent its warping out of shape and making destructive and uneven cuts, and the use of circular saws of little more, if any, than one half the thickness of those now required to perform the same class of work, may be used with safety, and thus friction and amount of power required in running machines reduced.

Third, it consists in the arrangement of the flat springs on the rising and falling muley head, and relatively to the saw; whereby the saw is prevented from striking against the pins of the guide when not cutting, and thus saved from having its stiffness impaired thereby.

To enable others skilled in the art to make and use my invention I will proceed to describe its construction and operation.

In Fig. 1 of the drawing A, A, represents a stationary bed or carriage way, along which the movable carriage B, B, passes with the log to be acted upon by the saw. The carriage is self shifting, being propelled by a combination of machinery well understood by mechanics and in common use.

C, C, represent the end screws which fasten and hold the movable frame, after having been raised or lowered to its required position, and G, G, the bolts which hold the frame at its fixed terminus, in such manner as to permit it to yield sufficiently without binding. H, represents the standard or rest upon which the back end of the mandrel revolves, and I, the front standard or rest upon which the front end of the mandrel revolves, and to which the metallic stationary saw shield I, I, is firmly attached and held in its position over the saw. This shield may be made either open or closed at the top as preferred.

K, K, represents the rising and falling circular muley head operated by a small shaft with hand wheel or crank L, and moving upon circular parallel bars within a bevel groove, upon either side of the inner surface of the saw shield, so as to lower or raise the guide pins and direct the course of the saw, as near the point of its attack upon the log or other substance as possible.

The lower end of the muley head or guide M, M, through which the guide pins are screwed or fastened has a series of holes in order that the pins may be shifted and made to keep a uniform position directly behind the saw teeth notwithstanding the gradual wearing away of the saw as well as to provide for their perfect action upon saws of large or small diameter as may be required.

N, N, represent the elastic anti-vibrating springs acting upon either side of the saw O, so as to prevent its vibrating or tremulous action.

The operation of the more complicated portions of the saw shield, muley head or guide and anti-vibrating springs, may be more clearly understood by reference to detached drawings, Figs. 2 and 3, with corresponding letters to those used in Fig. 1.

What I claim as my invention and desire to secure by Letters Patent, is

1. Suspending over the upper half of a saw, which is arranged to hang over the log to be sawed, a stationary metallic shield for the purpose of supporting the muley head, and serving as a guard to prevent injury to the operator; substantially as herein set forth.

2. The peculiar manner of arranging the circular muley head on the stationary elevated shield; whereby the guides are capable of being adjusted to any position desired without taking up any portion of the depth of the saw from the collar to the point of the teeth, and are always made to guide the saw just at and above the point of cutting; substantially as and for the purposes set forth.

3. I claim the springs n, n, when arranged on the rising and falling muley head and relatively to the saw; substantially as and for the purposes set forth.

G. W. RODEBOY.

Witnesses:
  EDM. F. BROWN,
  GOODWIN YORKE AT LEE.